N. W. LEADBETTER.
RAIL JOINT.
APPLICATION FILED MAY 28, 1915.
1,191,800.  Patented July 18, 1916.
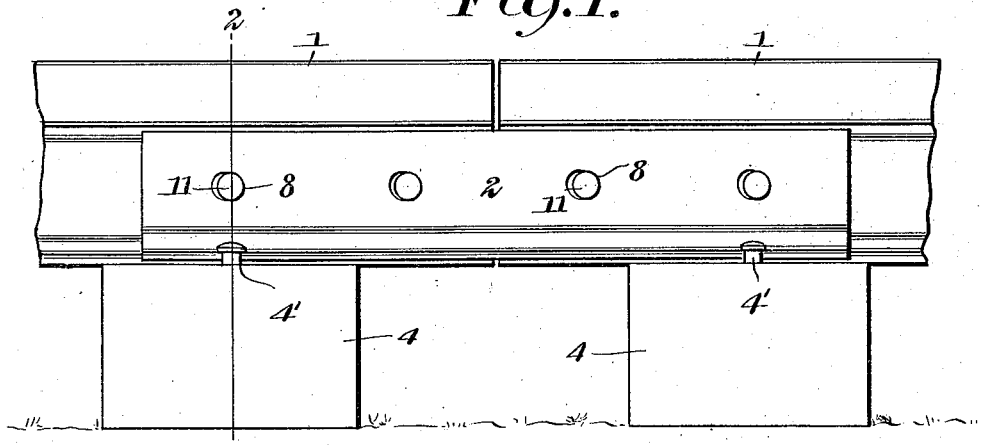
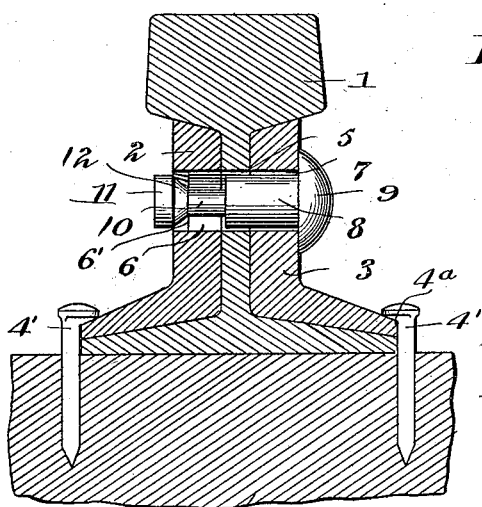
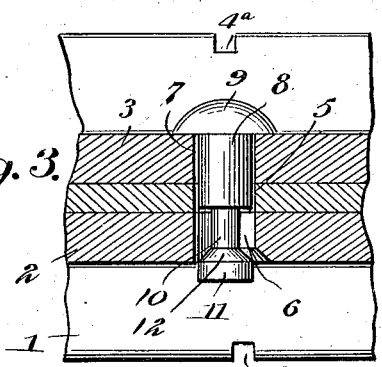
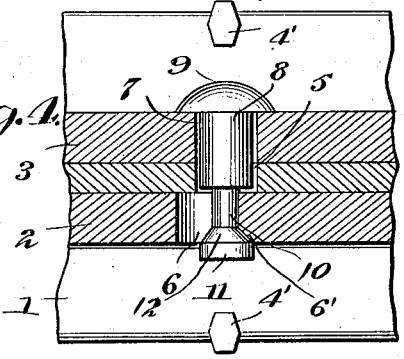
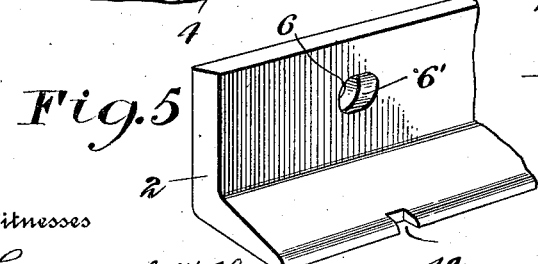
Inventor
N. W. Leadbetter.
By Victor J. Evans
Attorney
Witnesses
Frederick W. Ely

UNITED STATES PATENT OFFICE.

NOBLE W. LEADBETTER, OF BICKLETON, WASHINGTON, ASSIGNOR OF ONE-THIRD TO JENS NYGAARD, OF BICKLETON, WASHINGTON.

RAIL-JOINT.

1,191,800.  Specification of Letters Patent.  Patented July 18, 1916.

Application filed May 28, 1915. Serial No. 31,017.

*To all whom it may concern:*

Be it known that I, NOBLE W. LEADBETTER, a citizen of the United States, residing at Bickleton, in the county of Klickitat and State of Washington, have invented new and useful Improvements in Rail-Joints, of which the following is a specification.

The present invention relates to improvements in rail joints, and the primary object of the invention is to provide connecting means for the angle bars of the joint which will obviate the necessity of the provision of threaded elements, such as bolts and nuts therefor.

With the above and other objects in view, the improvement resides in the construction, combination and arrangement of parts set forth in the following specification and falling within the scope of the appended claim.

In the drawing: Figure 1 is a side elevation of two rails connected in accordance with the present invention, Fig. 2 is a transverse sectional view approximately on the line 2—2 of Fig. 1, Fig. 3 is a horizontal sectional view illustrating the manner in which the pin is first arranged through the openings in the rail web and fish plates, Fig. 4 is a similar view illustrating the arrangement of parts after the fish plate has been moved longitudinally of the rail, and Fig. 5 is a detail perspective view of the fish plate 2.

Referring now to the drawing in detail, 1—1 designates two rails having abutting ends, 2—3 the fish plates which are arranged upon the opposite sides of the rails, and 4 the ties which support the rails and fish plates. The angle bars 2—3 have their longitudinal edges formed with notches 4ª for the reception of securing spikes 4' which enter the ties and contact with the opposite longitudinal edges of the rails and have their heads overlying the horizontal flanges of the fish plates. The webs of the rails are provided with the usual bolt openings 5 and the fish plates 2 and 3 are likewise provided with similar bolt openings 6 and 7 respectively. The holes of the plates 2 are beveled inwardly toward their openings 6 upon their outer faces, as indicated by the numerals 6'.

The numerals 8 designate the shanks of headed pins 9, each of the shanks being provided with a reduced portion 10 which terminates in an enlarged head 11, and the inner wall of said head is beveled, as at 12, conforming to the beveled portion 6' of the holes of the plates 2.

The plates are assembled against opposite sides of the rails and the pins 8 are passed through the registering openings in the fish plates and in the webs of the rail. The body or shank 8 of each of the pins 9 is of a length so as not to project beyond the farther sides of the webs of the rails, as clearly shown in Fig. 3. When the parts are assembled as mentioned, the plate 2 is moved longitudinally in one direction to force the beveled depressions 6' into contact with the beveled shoulders 12 of the pins 9, and the wedging of the beveled surfaces 6' against the beveled or inclined walls 12 of the pins will force the heads of the pins tightly into engagement with the outer face of the fish plate 3 and also hold the heads 11 in locked position upon the fish plates 2. It is, of course, to be understood that the spikes 4' are not driven until after the joint is assembled as above described, and it is to be further understood that a considerable amount of force, such as the impact of a hammer or the like upon the end of the fish plate 2 is required for tightly forcing the heads 9 and 11 against the opposite faces of the respective plates 3 and 2. The depression 6' does not tend to weaken the plate and the same may be formed by the employment of common tools, such, for instance, as a reamer or a rat tail file. The plate is not of a special construction but any ordinary fish plate having the usual bolt opening may be employed, it being merely necessary to provide the same with a depression 6', in a manner as above indicated. The construction is considered advantageous over fish plates or similar devices provided with the usual key hole slots to receive the heads of the securing elements, for the reason that such slots tend to weaken the plate and also add materially to the cost of construction, inasmuch as special stamping machines must be employed for forming the said key hole openings.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

The combination with the meeting ends of rails, ties upon which the rails rest and fish plates for connecting the rails, each of said fish plates having round openings which register with the bolt openings in the webs of the rails and having their longitudinal edges notched, one of the fish plates, upon its outer face, and to one of the sides of each bolt opening being formed with a cone-shaped depression which communicates with its said bolt opening, locking elements passing through the openings, each of said elements including a shank of a length equaling the thickness of one of the fish plates and the webs of the rails and a cross sectionally round reduced portion extending from the shank of a length equaling the length of the bolt opening at the juncture of the mentioned depressed portion therewith, said reduced extension being formed with a head having an inner cone-shaped surface whereby to engage with the mentioned depressions communicating with the openings in one of the fish plates when the said fish plate is moved longitudinally and the wall of its openings contacts with the reduced portion of the securing elements and spiked to the ties to retain the locking elements in such engagement with the fish plates.

In testimony whereof I affix my signature in presence of two witnesses.

NOBLE W. LEADBETTER.

Witnesses:
 AVERY R. HAYES,
 Mrs. N. W. LEADBETTER.

Copies of this patent may be obtained for five cents each, by addressing the "Commissioner of Patents, Washington, D. C."